(12) United States Patent
Chen et al.

(10) Patent No.: US 7,464,248 B2
(45) Date of Patent: Dec. 9, 2008

(54) MICROPROCESSOR SYSTEMS AND BUS ADDRESS TRANSLATION METHODS

(75) Inventors: Wei-Jen Chen, Banqiao (TW); Shih-Hung Lin, Hsinchu (TW); Yao-Huang Hsieh, Zhubei (TW)

(73) Assignee: Mediatek Incorporation, Hsin-Chu (TW)

( * ) Notice: Subject to any disclaimer, the term of this patent is extended or adjusted under 35 U.S.C. 154(b) by 655 days.

(21) Appl. No.: 11/113,891

(22) Filed: Apr. 25, 2005

(65) Prior Publication Data

US 2006/0242383 A1  Oct. 26, 2006

(51) Int. Cl.
*G06F 12/00* (2006.01)
(52) U.S. Cl. .................... 711/202; 711/2; 711/102; 711/165; 711/170; 714/6; 714/7
(58) Field of Classification Search .............. 711/2, 711/102, 165, 170; 365/200; 714/6, 7
See application file for complete search history.

(56) References Cited

U.S. PATENT DOCUMENTS

| | | | |
|---|---|---|---|
| 4,028,678 A | 6/1977 | Moran | 340/172.5 |
| 4,028,679 A | 6/1977 | Divine | 340/172.5 |
| 4,028,683 A | 6/1977 | Divine et al. | 340/172.5 |
| 4,028,684 A | 6/1977 | Divine et al. | 340/172.5 |
| 4,150,428 A | 4/1979 | Inrig et al. | 364/200 |
| 4,400,798 A | 8/1983 | Francis et al. | 365/174 |
| 4,542,453 A | 9/1985 | Patrick et al. | 364/200 |
| 4,802,119 A | 1/1989 | Heene et al. | 364/900 |
| 4,905,200 A | 2/1990 | Pidsosny et al. | 364/300 |
| 5,408,672 A | 4/1995 | Miyazawa et al. | 395/800 |
| 5,426,746 A | 6/1995 | Sekiguchi | 395/375 |
| 5,454,100 A | 9/1995 | Sagane | 395/182.06 |
| 5,479,342 A | 12/1995 | Sakamoto et al. | 364/184 |
| 5,481,713 A | 1/1996 | Wetmore et al. | 395/700 |
| 5,546,586 A | 8/1996 | Wetmore et al. | 395/700 |
| 5,574,926 A | 11/1996 | Miyazawa et al. | 395/800 |
| 5,581,776 A | 12/1996 | Hagqvist et al. | 395/590 |
| 5,592,613 A | 1/1997 | Miyazawa et al. | 395/182.04 |
| 5,790,860 A | 8/1998 | Wetmore et al. | 395/705 |
| 5,799,144 A | 8/1998 | Mio | 395/183.14 |
| 5,867,701 A | 2/1999 | Brown et al. | 395/598 |
| 5,938,766 A | 8/1999 | Anderson et al. | 713/100 |
| 6,073,252 A | 6/2000 | Moyer et al. | 714/7 |
| 6,128,751 A | 10/2000 | Yamamoto et al. | 714/8 |
| 6,135,651 A | 10/2000 | Leinfelder et al. | 395/712 |
| 6,141,740 A | 10/2000 | Mahalingaiah et al. | 711/215 |

(Continued)

FOREIGN PATENT DOCUMENTS

CN  1208194  2/1999

(Continued)

*Primary Examiner*—Jack A Lane
(74) *Attorney, Agent, or Firm*—Thomas, Kayden, Horstemeyer & Risley

(57) ABSTRACT

A microprocessor system contains a read-only memory (ROM) for storing programs or firmware. Retrieval and execution of program code is controlled by a microprocessor address bus. Erroneous data in the ROM can be corrected by address comparison and translation. Trap, region, and patch tables are provided to store addresses, regions, and translated addresses. An address issued by the microprocessor is stored in the trap and region tables can be translated for selecting another programmable device, such as a SRAM or DRAM, other than the original ROM. Thus, erroneous code in the ROM can be corrected, inserted, or replaced.

27 Claims, 12 Drawing Sheets

U.S. PATENT DOCUMENTS

| | | |
|---|---|---|
| 6,189,145 B1 | 2/2001 | Bellin, Jr. et al. ............. 717/11 |
| 6,237,120 B1 | 5/2001 | Shimada et al. ............. 714/726 |
| 6,260,157 B1 | 7/2001 | Schurecht et al. ............. 714/8 |
| 6,351,822 B1 | 2/2002 | Wright et al. ................. 714/8 |
| 6,438,664 B1 | 8/2002 | McGrath et al. ............ 711/154 |
| 6,463,549 B1 | 10/2002 | Shperber et al. ............... 714/7 |
| 6,931,477 B2 * | 8/2005 | Oakley et al. ................ 711/2 |
| 6,967,878 B2 * | 11/2005 | Dono ......................... 365/200 |
| 2004/0128471 A1 * | 7/2004 | Oakley et al. ............... 711/220 |
| 2004/0163080 A1 * | 8/2004 | Menon et al. ............... 717/168 |

FOREIGN PATENT DOCUMENTS

| | | |
|---|---|---|
| CN | 1373872 | 10/2002 |
| EP | 0458559 A2 | 11/1991 |

\* cited by examiner and examples with references made to the accompanying drawings, wherein:

MICROPROCESSOR SYSTEMS AND BUS ADDRESS TRANSLATION METHODS

BACKGROUND

The invention relates to program patching methods, and in particular to program patching methods and systems using bus address translation.

A microprocessor system generally contains a read-only-memory (ROM) to store programs or firmware. The programs or firmware can be retrieved and executed by a microprocessor through address buses. An electronic product, such as a DVD player, or a computer, may contain a microprocessor system with a ROM for system controlling.

A ROM in a microprocessor system is generally called an on-chip ROM. While a ROM is a non-writable device, the ROM in a microprocessor system generally stores permanent data. When an electronic product with an on-chip ROM is delivered to a customer, the data stored in the ROM is unchangeable.

If a program in a ROM contains erroneous code or requires modification, a program patch may be executed for such correction or modification. U.S. Pat. No. 4,542,453 discloses a data processing system, using one bit for each potential ROM address to indicate a program branch for programs in a ROM. U.S. Pat. No. 5,581,776 provides a branch control system for ROM-programmed processors, which modifies a program counter for manifesting program count values and executing a prestored program in accordance with the program count values. Additionally, U.S. Pat. No. 6,237,120 discloses a method of program patching a ROM, which changes the address of a microprocessor by hardware interrupt to execute the program patch.

The mentioned methods and systems have some drawbacks. For example, using one bit for each potential ROM address may heavily increase system load. Modifying a program counter for a branch lacks flexibility as it can only branch for one source/target pair. Changing microprocessor addresses cannot be applied to certain systems, such as a system with pipelined CPU (central processing unit). Therefore, a more flexible and low cost method and system is desirable.

SUMMARY

An exemplary embodiment of a microprocessor system comprises a microprocessor and a trap controller. The microprocessor issues a first address to a first address bus. The trap controller, coupled to the first address bus and comprising a trap table, a region table, and a patch table, fetches the first address from the first address bus, translates the first address to a second address according to the trap, region, and patch tables, and issues the second address to a second address bus.

DESCRIPTION OF THE DRAWINGS

The invention can be more fully understood by reading the subsequent detailed description and examples with references made to the accompanying drawings, wherein.

DESCRIPTION

Figure 1:
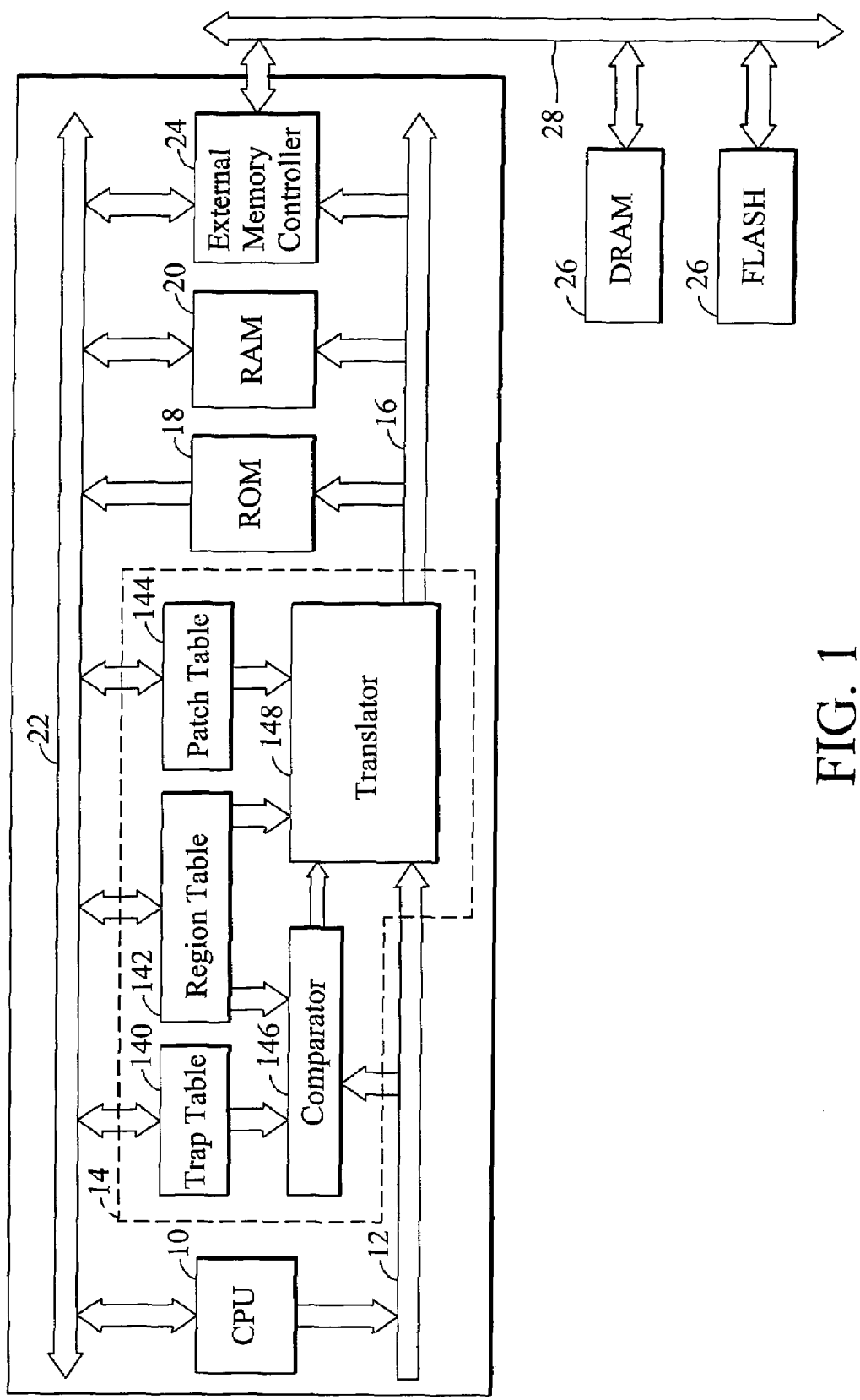
FIG. 1 is a diagram of an embodiment of a microprocessor system.

Microprocessor systems with program patching are provided. FIG. 1 is a diagram of an embodiment of a microprocessor system. A microprocessor 10, such as a CPU, issues a first address to a first address bus 12. A trap controller 14, coupled to the first address bus 12, includes a trap table 140, a region table 142, and a patch table 144. The trap controller 14 fetches the first address from the first address bus, translates the first address to a second address according to the trap, region, and patch tables 140, 142, 144, and issues the second address to a second address bus 16.

The microprocessor system further includes a first storage device 18 and a second storage device 20. The first storage device 18, such as a ROM, is coupled to the second address bus 16 and stores data addressed in the first address. The second storage device 20, such as a random-access-memory (RAM), is coupled to the second address bus 16 and stores data addressed in the second address.

The trap controller 14 further includes a comparator 146 and a translator 148. The comparator 146, coupled to the trap table 140 and the region table 142, compares a trap address and a region according to the first address to acquire a comparison result. The trap address is recorded in the trap table 140 and the region is recorded in the region table 142. The translator 148, coupled to the region table 142, the patch table 144, and the comparator 146, fetches the second address from the patch table 144 according to the comparison result and issues the second address to the second address bus 16.

Figure 2:
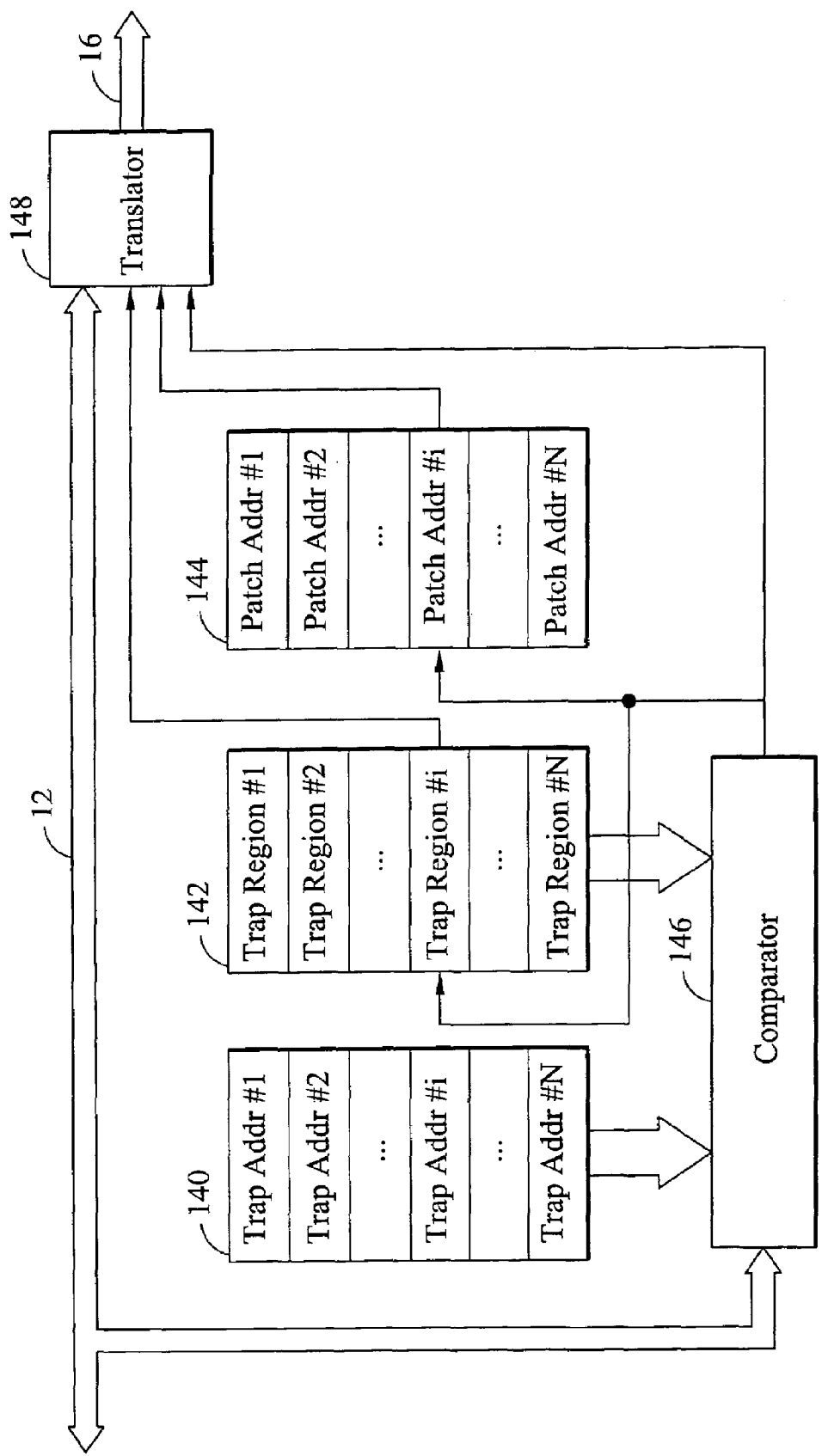
FIG. 2 is a diagram of an embodiment of a trap controller.

For example, if the microprocessor is a CPU 10, the CPU 10 issues an address to the address bus 12 and fetches data from a data bus 22. FIG. 2 is a diagram of an embodiment of a trap controller. The comparator 146 compares the address issued by the CPU 10, hereinafter called CPU address, with records in the trap table 140 and the region table 142. If the CPU address matches the trap region that is defined by both of the records in the trap table 140 and the region table 142, the comparator 146 issues a hit signal and indicates the corresponding trap region in the region table 142 and the patch address in the patch table 144 to the translator 148.

The translator 148 then translates the CPU address to a translated address according to the comparison result via fetching the corresponding records in the patch table 144 and the region table 142. The translator 148 then issues the translated address to the translated address bus 16, thus desired program code can be located.

The CPU address may not fall into the trap table, so the translated address is the CPU address. The region functions as a mask to determine compared bits of the CPU address. The size of the region can vary, depending on actual requirements.

Figure 3:
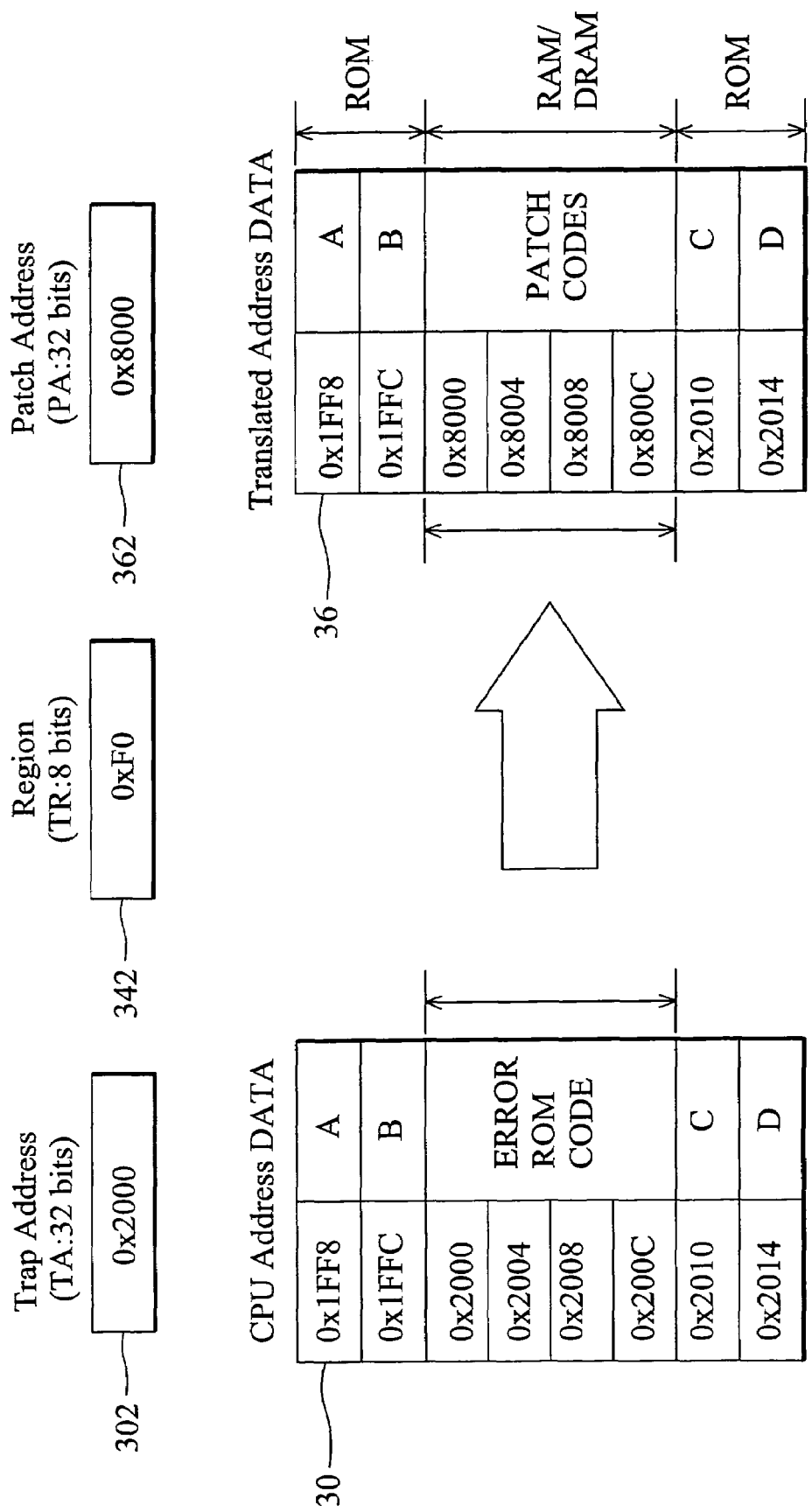
FIG. 3 is a diagram of an embodiment of bus address translation using the trap, region, and patch tables.

FIG. 3 is a diagram of an embodiment of bus address translation using the trap, region, and patch tables. For example, an on-chip ROM 30 is located from address 0x1000 to 0x3000, and a SRAM or a DRAM 36, storing correct ROM code, is located from address 0x6000 to 0x10000. The address and data bus are all 32 bits. A record, that is a trap pointer (TA) 302, in the trap table equals 0x2000, and its corresponding region (TR) 342 is 0xF0 (8 bits). The region (TR) 342 is the address bit comparison indicator. If TR=0x00, the corresponding TA 302 is disabled and ignored by the comparator. If TR=0xFF, all the CPU address bits are compared to the TA 302. If TR=0xF0, the 4 least significant bits (LSB) of the CPU address will be ignored during address comparison and the region extends to 16 bytes. When the CPU issues an address from 0x2000 to 0x200C, the address is translated to a patch address 362 from 0x8000 to 0x800C. The patch code in the SRAM or DRAM 36 will be sent to the CPU through the data bus to replace erroneous code in the ROM 30 addressed from 0x2000 to 0x200C.

Referring again to FIG. 1, the RAM 20 or other storage device, such as a SRAM, storing correct program code, is coupled to the translated address bus 16 rather than the CPU address bus 12. An external memory controller 24 controls an external memory bus 28 to provide the CPU 10 to access external memory devices 26, such as a FLASH, a DRAM or other storage devices. This external memory controller 24 can also be coupled to the translated address bus 16. Therefore, the correct program code can be stored in the external storage devices 26 rather than in the on-chip storage devices.

Figure 4:
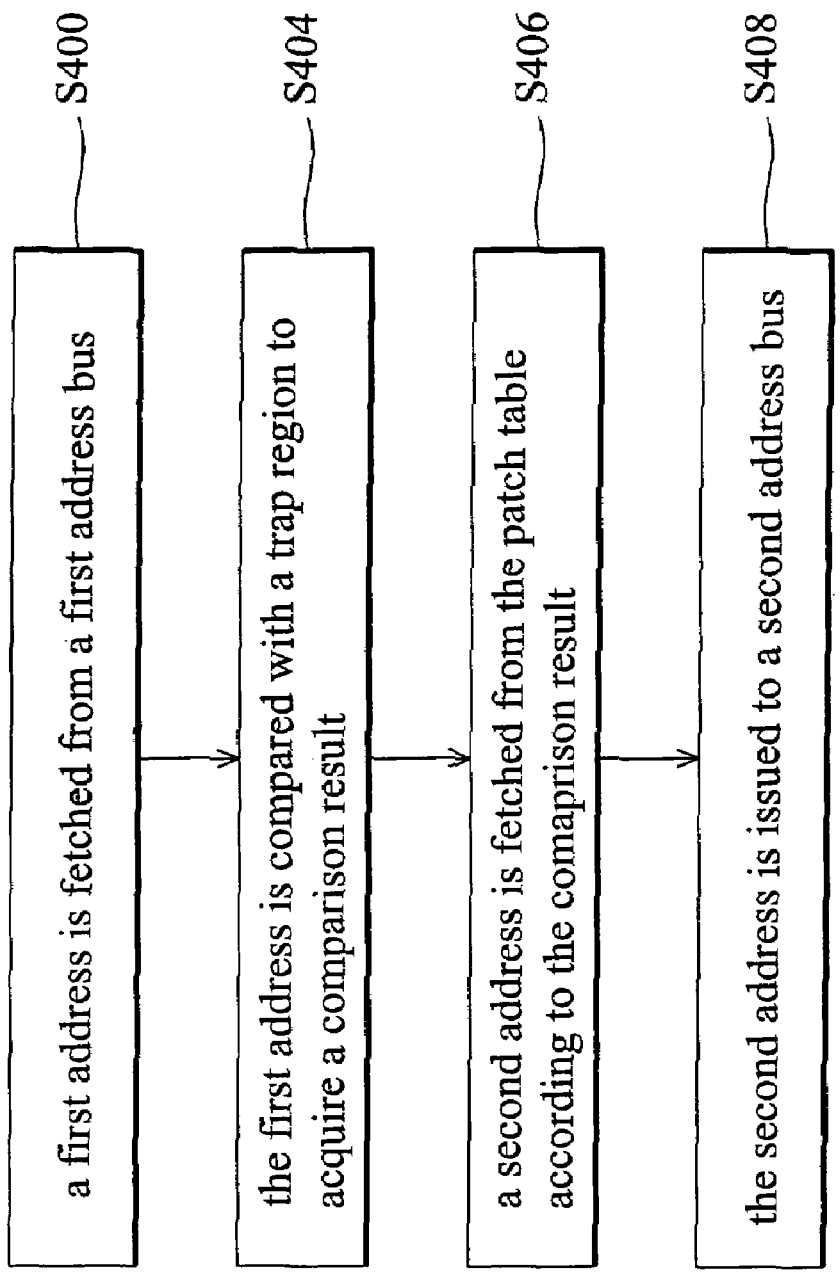
FIG. 4 is a flowchart of an embodiment of a bus address translation method.

FIG. 4 is a flowchart of an embodiment of a bus address translation method. A first address is fetched from a first address bus (step S400). The first address is translated to a second address according to a trap table, a region table, and a patch table.

The first address is first compared with a trap region to acquire a comparison result (step S404). The reap region address is acquired by a trap address in the trap table and a region in the region table. A second address is then fetched from the patch table according to the comparison result (step S406). The second address is issued to a second address bus (step S408).

Here, the data or program addressed in the first address is stored in a first storage device, such as a ROM, and the data or program addressed in the second address is stored in a second storage device, such as a RAM.

Figure 5:
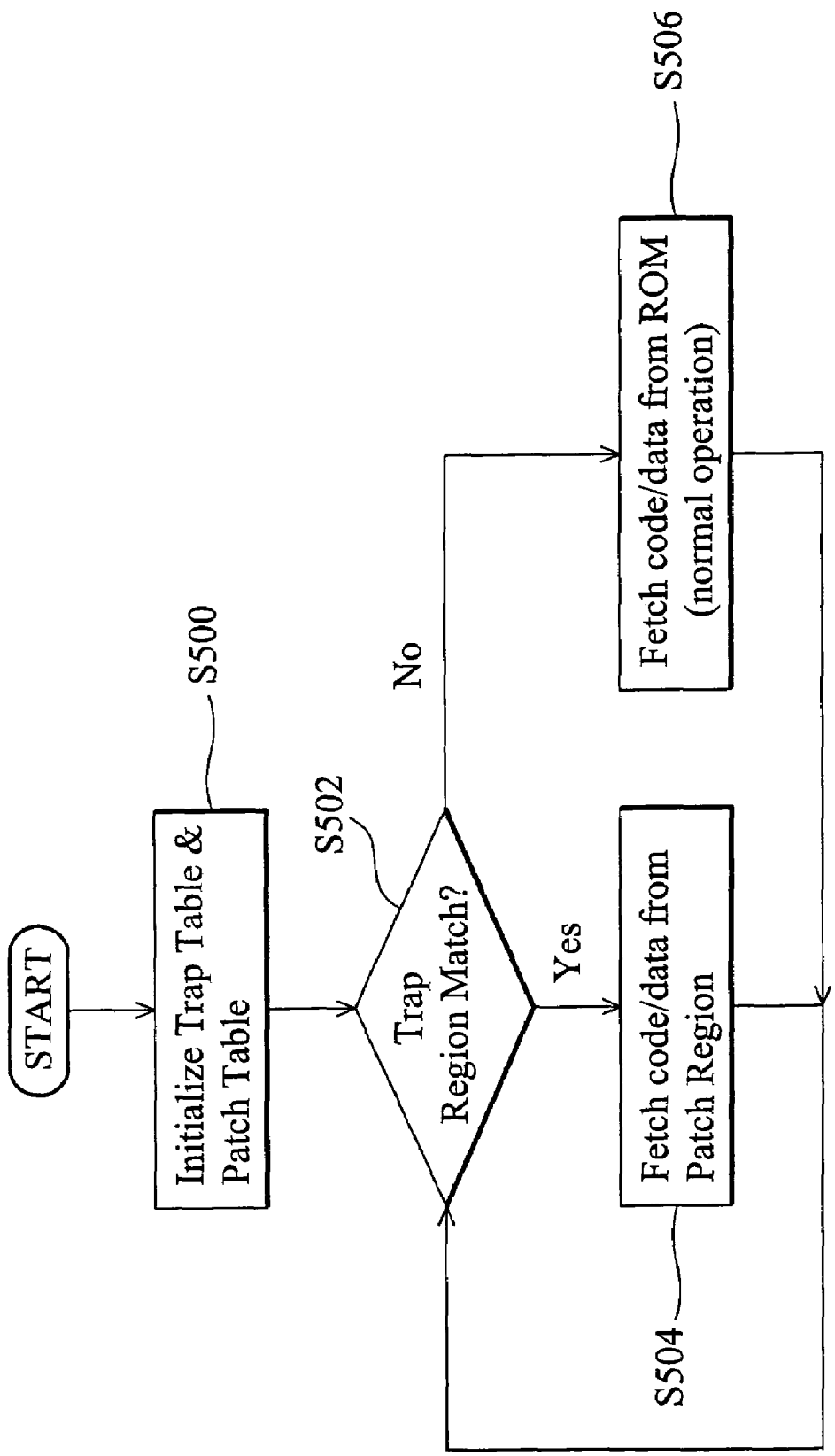
FIG. 5 is a flowchart of an embodiment of a program patching method using bus address translation.

FIG. 5 is a flowchart of an embodiment of a program patching method using bus address translation. A trap table, a region table, and a patch table are first initialized (step S500). A first address is compared with a trap region to acquire a comparison result (step S502). The trap region is defined by the records in the trap table and the region table. If the comparison result is matched, a patch record indicating a second address is fetched from the patch table and second code is fetched according to the second address (step S504). If the comparison result is not matched, first code is fetched according to the first address (step S506).

Here, the trap, region, and patch tables can be established in a microprocessor system. The first address is issued by the microprocessor to a first address bus and the second address is issued by a controller to a second address bus. The first code can be stored in a ROM and the second code can be stored in a RAM.

As described, the provided systems and methods translate the address indicating to correct data, representing convenience significantly for program patching. The provided systems and methods can also be applied to manufacturing defect recovery for a ROM or data replacement.

Figure 6:
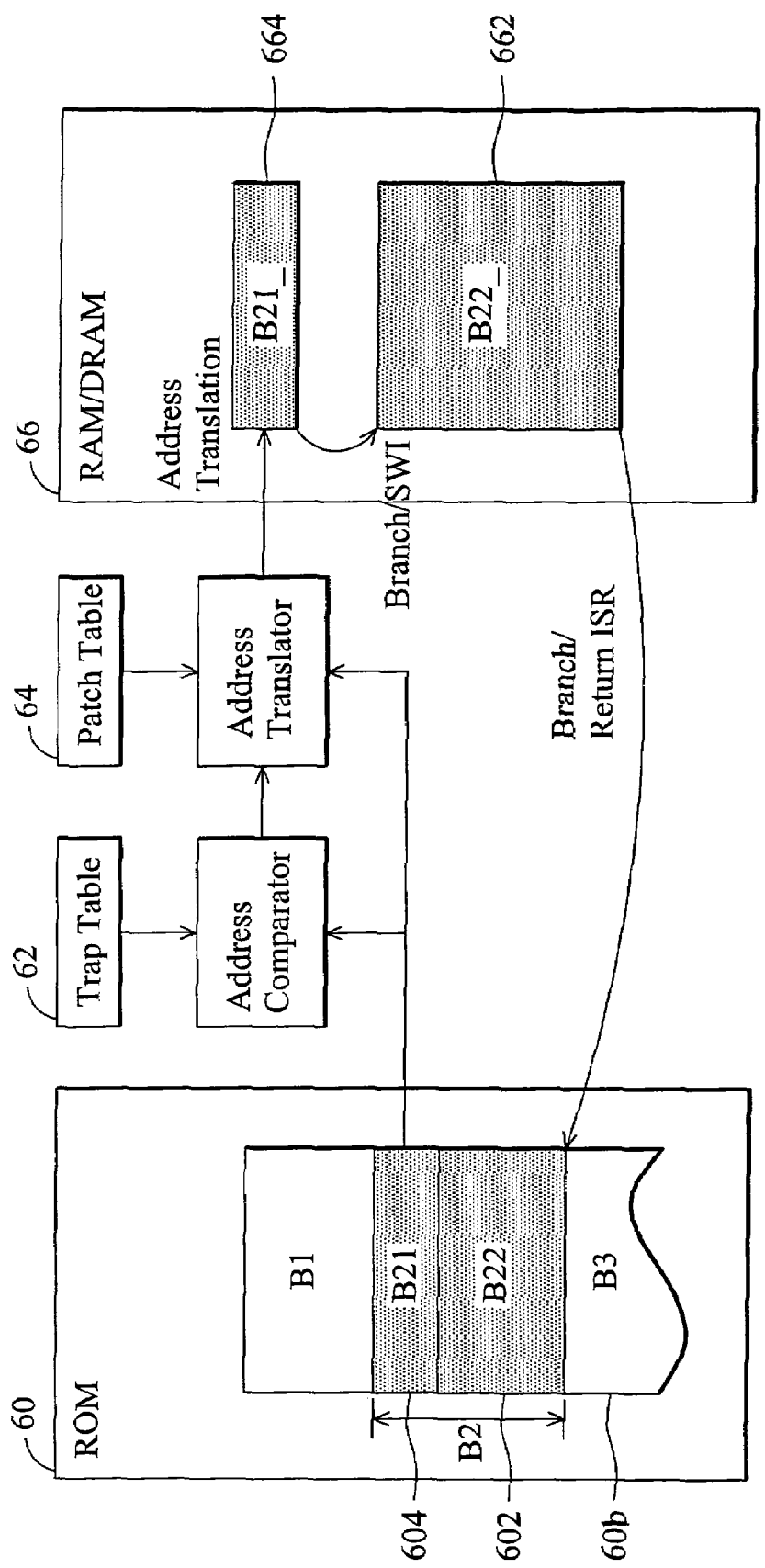
FIG. 6 is a diagram of an exemplary embodiment of ROM code replacement using a bus address translation method.

FIG. 6 is a diagram of an exemplary embodiment of ROM code replacement using a bus address translation method. For example, a large segment of ROM code indicated by B2 602 in a ROM 60 is replaced. B21 604 is a CPU address that falls into a trap region defined by a trap table 62 and a region table not shown here. A translated address, that is B21_ 664, is acquired from a patch table 64. Code B21 604 is replaced by code B21_ 664 in a RAM or DRAM 66 through bus address translation.

A branch instruction may be used in code B21_ 664 for jumping to B22_ 662, replacing the whole segment B2 602 in the ROM 60. For some systems, the branch can be implemented by one direct instruction, such as "JUMP" or "BRANCH". Alternatively, for some other systems, such as an ARM thumb mode, the branch cannot be implemented by one direct instruction. Therefore, an address attached by a region is effectual for bus address comparison rather than a single address. Additionally, a software interrupt service routine (ISR) can be used for program branch. Code B22_ 662 can be placed in the ISR to achieve the program branch.

A return address can be modified in the end of the ISR for returning an entry point of code B3 606. Thereafter, the program can return to regular executive procedure in ROM 60.

Figure 7A:
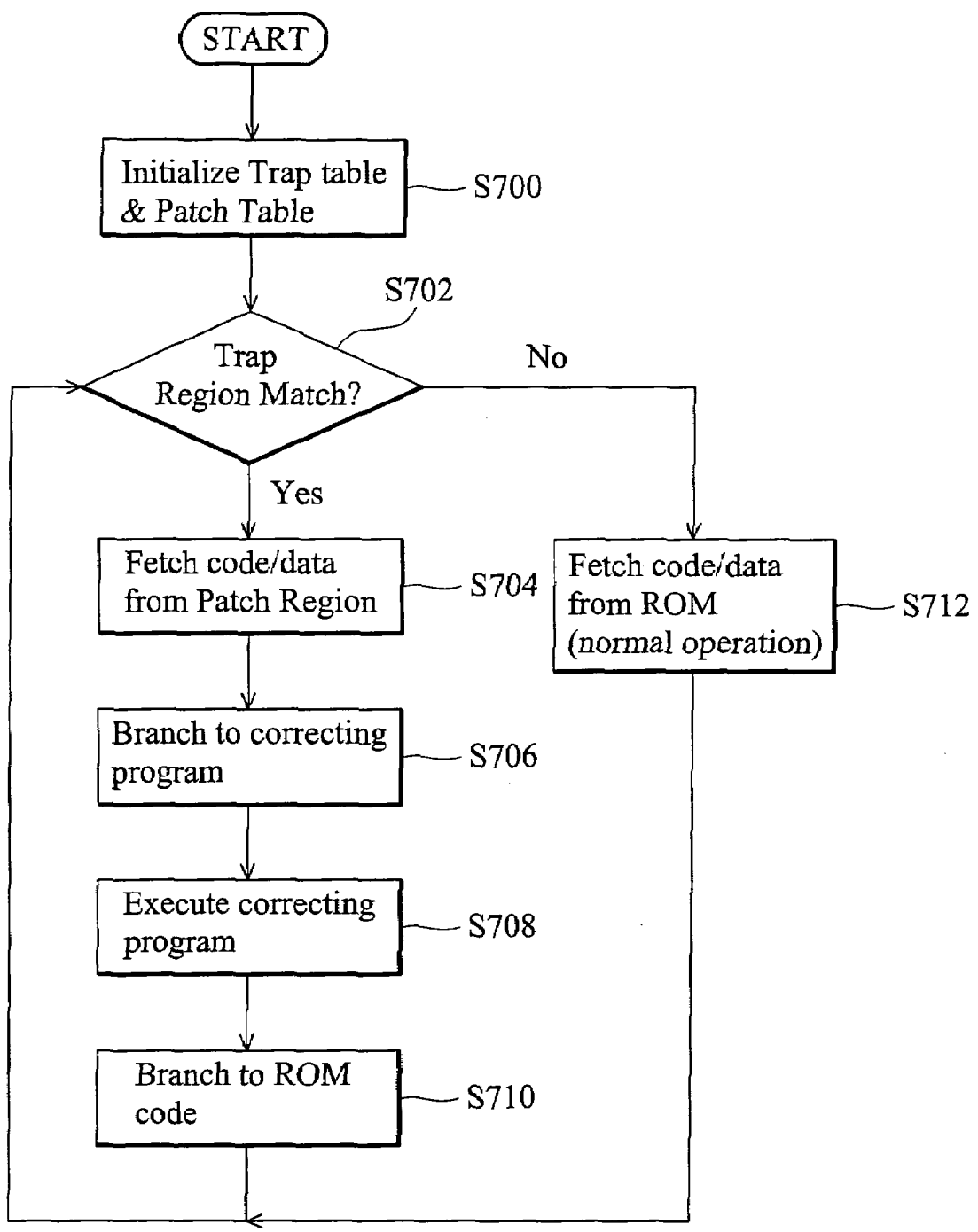
FIG. 7a is a flowchart of an exemplary embodiment of ROM code replacement using a bus address translation method.
Figure 7B:
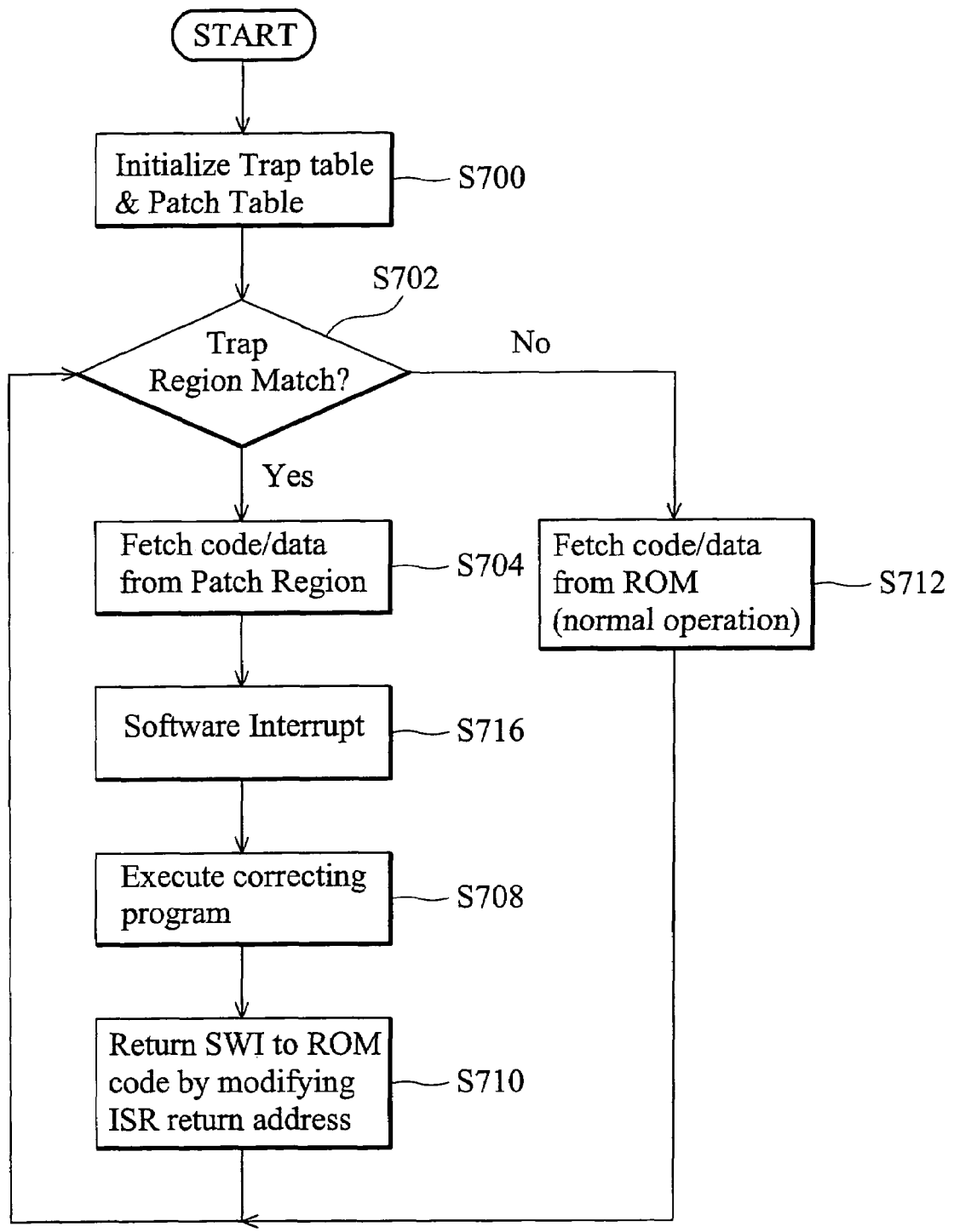
FIG. 7b is a flowchart of an exemplary embodiment of ROM code replacement using a bus address translation method.

FIG. 7a and FIG. 7b are flowcharts of an exemplary embodiment of ROM code replacement using a bus address translation method. FIG. 7a illustrates ROM code replacement using branch instructions. A trap table, a region table, and a patch table are first initialized (step S700). An address is compared with records in the trap table and the region table (step S702). If the comparison is matched, a translated address is fetched from the patch table (step S704). If the comparison is not matched, code or data is fetched from a ROM (step S712). The execution branches to correct code according to the translated address through branch instructions (step S706). The correct code is executed thereafter (step S708). The program execution then returns to ROM code finally (step S710).

FIG. 7b illustrates ROM code replacement using software interrupt service routine (ISR). The difference between FIG. 7a and FIG. 7b is the branch instructions in step S706, are replaced by the software interrupt service routine (ISR) (step S716). If the branch instructions are replaced by an ISR, the return can be accomplished by modifying ISR return address in step S710.

Figure 8:
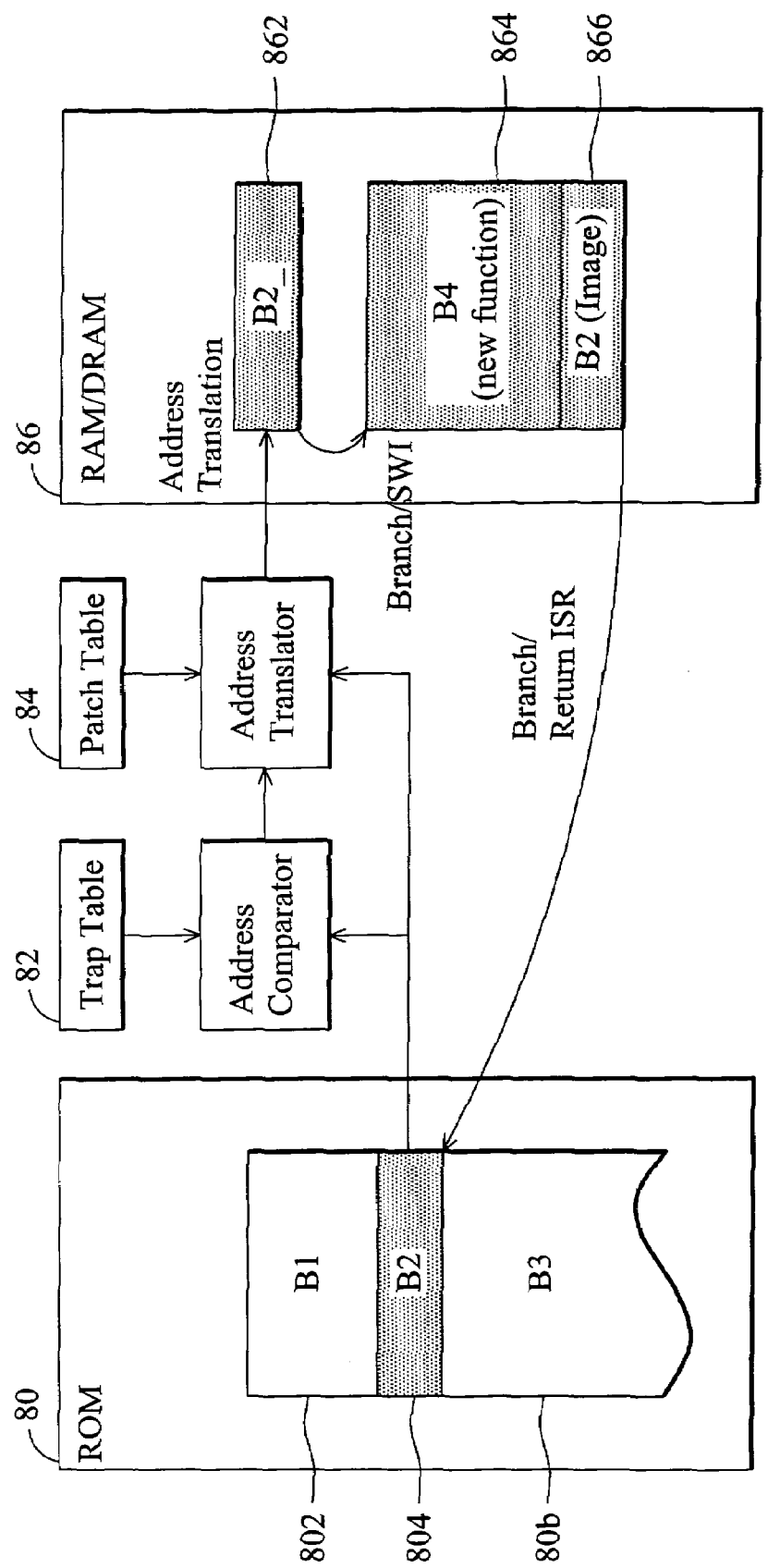
FIG. 8 is a diagram of an exemplary embodiment of new code insertion using a bus address translation method.

FIG. 8 is a diagram of an exemplary embodiment of new code insertion using a bus address translation method. For example, new function code B4 864 in a RAM 86 is appended after code B1 802 in a ROM 80. The address of B2 804 and a corresponding region is translated to B2_ 862 in the RAM 86 through a trap table 82, a region table, and a patch table 84. The program execution branches to B4 864 in B2_ 862 and executes code thereof. Since B2 804 is replaced by B2_ 862, B2 804 has to be recovered after the execution of B4 864. A copy of B2, that is B2(image) 866, is appended to B4. After execution of B2(image) 866, the program execution returns to B3 806 in the ROM 80. A new function code B4 864 in the RAM 86 is thus inserted between B1 802 and B2 804 in the ROM 80.

Figure 9A:
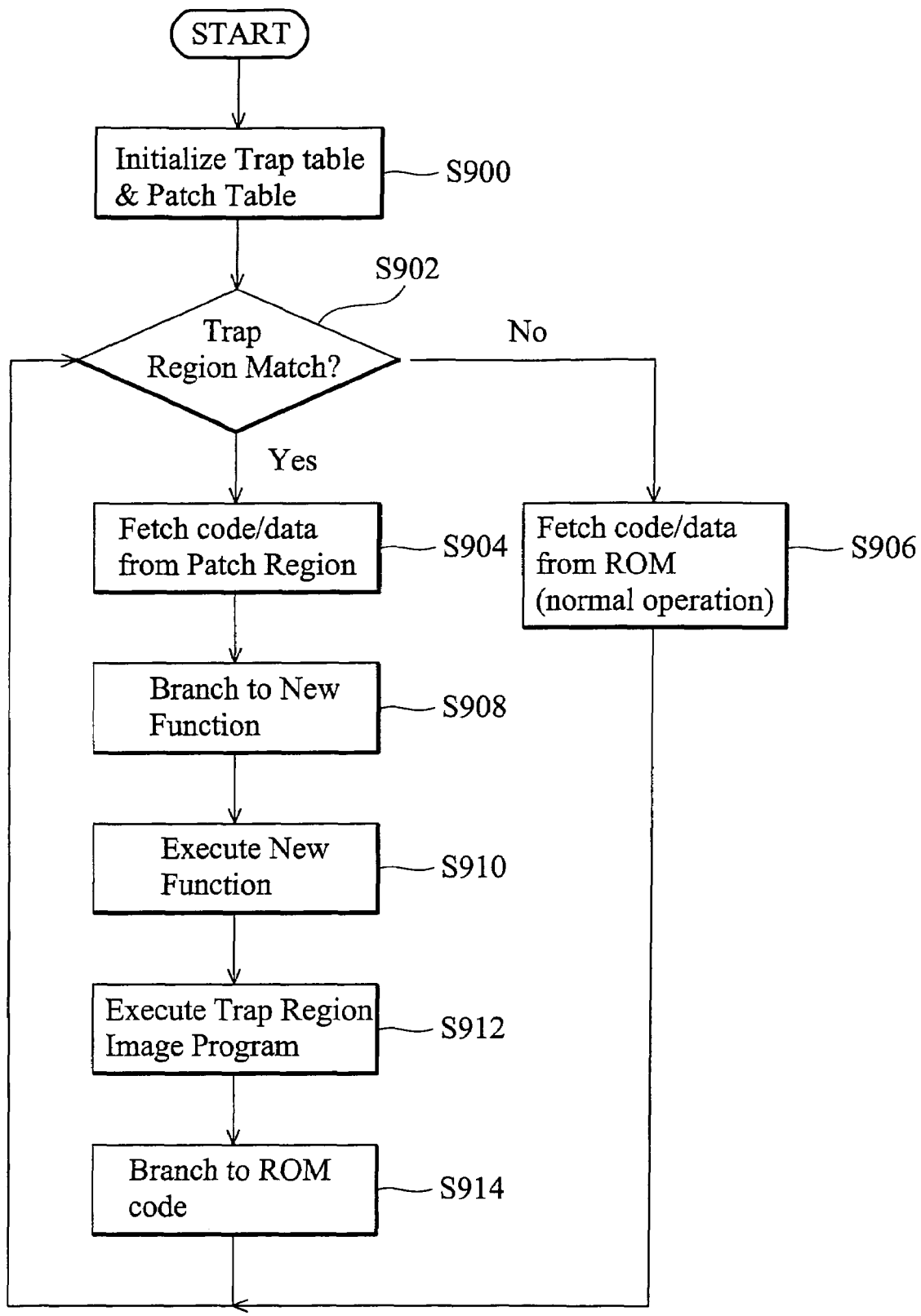
FIG. 9a is a flowchart of the exemplary embodiment of new code insertion using a bus address translation method.
Figure 9B:
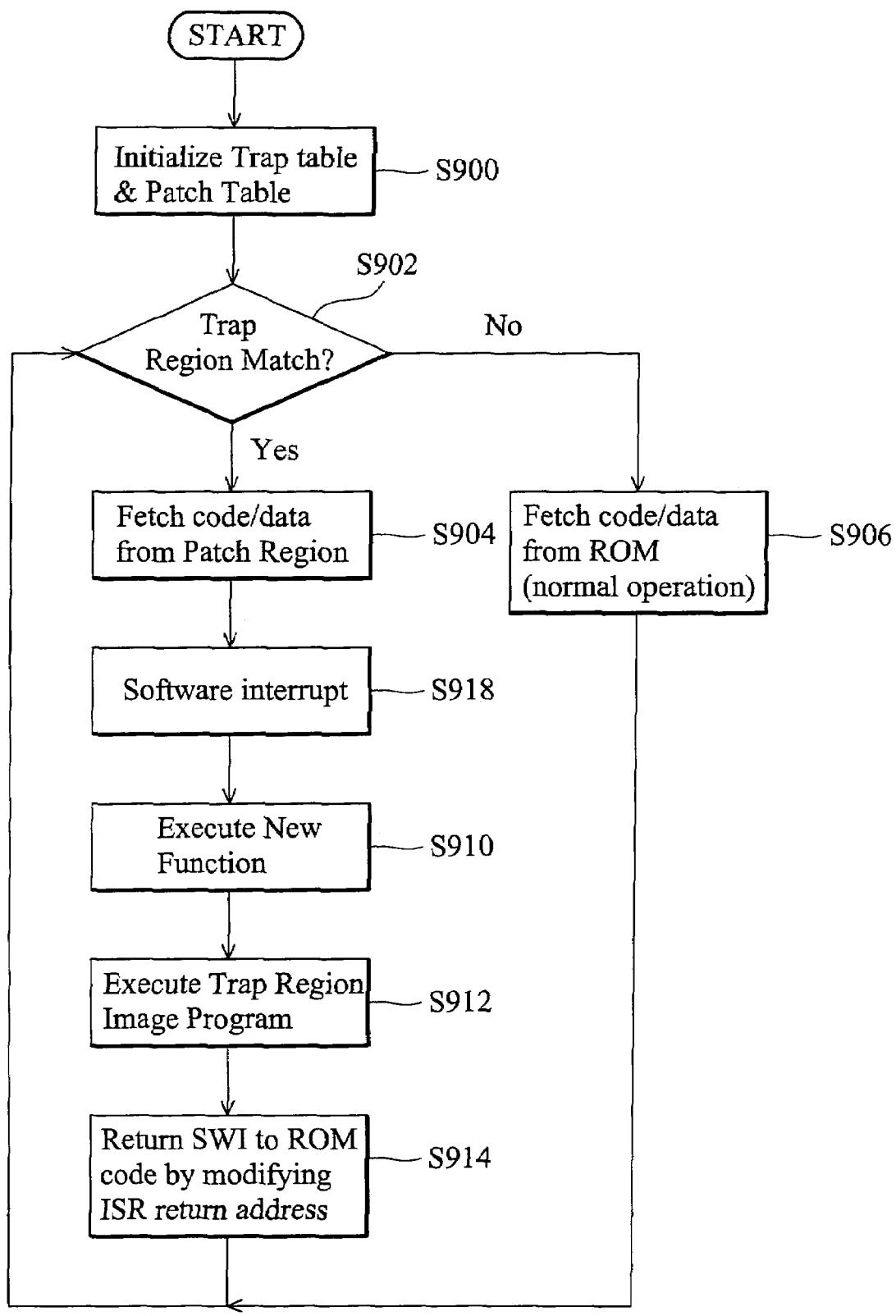
FIG. 9b is a flowchart of the exemplary embodiment of new code insertion using a bus address translation method.

FIG. 9a and FIG. 9b are flowcharts of the exemplary embodiment of new code insertion using a bus address translation method. FIG. 9a illustrates new code insertion using branch instructions. A trap table, a region table, and a patch table are first initialized (step S900). An address is compared with records in the trap table and the region table (step S902). If the comparison is matched, a translated address is fetched from the patch table (step S904). If the comparison is not matched, code or data is fetched from a ROM (step S906). The execution branches to new function code according to the translated address through branch instructions (step S908). The new function code is executed thereafter (step S910). The trap region image code is executed thereafter (step S912). Finally, the program execution returns to ROM code (step S914).

FIG. 9b illustrates new code insertion using a software interrupt service routine (ISR). The difference between FIG. 9a and FIG. 9b is the branch instructions in step S908, are replaced by the software interrupt service routine (ISR) (step S918). If the branch instructions are replaced by an ISR, the return can be accomplished by modifying the ISR return address in step S914.

Figure 10:
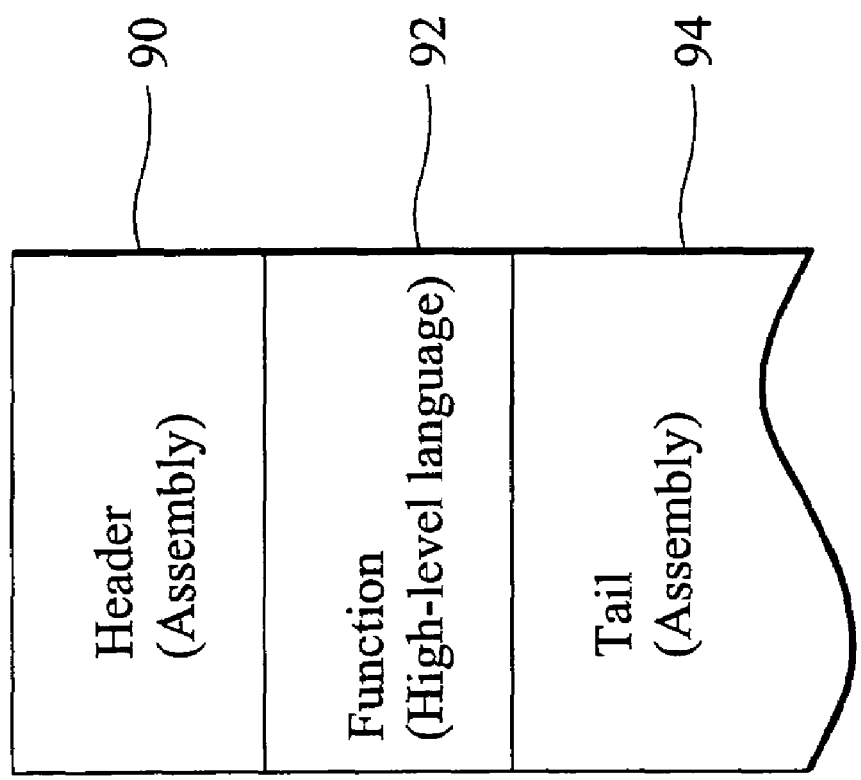
FIG. 10 is a diagram of an embodiment of the structure of a patch program.

A patch program can be written by low-level programming languages, such as assembly language. Low-level programming languages, however, are difficult to maintain and develop. FIG. 10 is a diagram of an embodiment of the structure of a patch program. The beginning/header 90 and/or end/tail 94 of the patch program can be implemented in low-level languages, while the main function 92 can be accomplished by a high-level programming language, such as the C language to increase flexibility and speed of program development.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing and embodiment of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents

What is claimed is:

1. A microprocessor system, comprising:
   a microprocessor, issuing a first address to a first address bus;
   a trap controller, coupled to the first address bus, comprising a trap table, a region table and a patch table, fetching the first address from the first address bus, translating the first address to a second address according to the trap and patch tables, and issuing the second address to a second address bus, and the controller comprising:
   a comparator, coupled to the trap and region tables, comparing a trap address recorded in the trap table with the first address based on a corresponding region recorded in the region table to acquire a comparison result, wherein a number of bits of the trap address and the first address to be compared is determined based on the corresponding region; and
   a translator, coupled to the region table, the patch table, and the comparator, fetching a second address from the patch table according to the comparison result and issuing the second address to the second address bus.

2. The microprocessor system as claimed in claim 1, further comprising:
   a first storage device, coupled to the second address buses, storing data addressed in the first address; and
   a second storage device, coupled to the second address buses, storing data addressed in the second address.

3. The microprocessor system as claimed in claim 2, wherein the first storage device is a read-only-memory.

4. The microprocessor system as claimed in claim 2, wherein the second storage device is a random-access-memory.

5. The microprocessor system as claimed in claim 2, wherein the second storage device is a register.

6. The microprocessor system as claimed in claim 2, wherein the second storage device is a hardware logic connection device.

7. The microprocessor system as claimed in claim 2, wherein the second storage device is a programable non-volatile memory device.

8. The microprocessor system as claimed in claim 1, wherein the second address bus is different from the first bus.

9. A bus address translation method, comprising:
   fetching a first address from a first address bus;
   translating the first address to a second address according to a trap table, a region table, and a patch table by comparing a trap address recorded in the trap table and a corresponding region recorded in the region table according to the first address to acquire a comparison result, wherein a number of bits of the trap address and the first address to be compared is determined based on the corresponding region, and fetching the second address from the patch table according to the comparison result; and
   issuing the second address to a second address bus which is different from the first bus.

10. The bus address translation method as claimed in claim 9, wherein the translation further comprises:
    comparing a trap address according to the first address to acquire a comparison result, wherein the trap address is recorded in the trap table; and
    fetching the second address from the patch table according to the comparison result.

11. The bus address translation method as claimed in claim 9, further comprising:
    storing data addressed in the first address in a first storage device; and
    storing data addressed in the second address in a second storage device.

12. The bus address translation method as claimed in claim 11, wherein the first storage device is a read-only-memory.

13. The bus address translation method as claimed in claim 11, wherein the second storage device is a random-access-memory.

14. The bus address translation method as claimed in claim 11, wherein the second storage device is a register.

15. The bus address translation method as claimed in claim 11, wherein the second storage device is a hardware logic connection device.

16. The bus address translation method as claimed in claim 11, wherein the second storage device is a programable non-volatile memory device.

17. A program patching method using bus address translation, comprising:
- initializing a trap table, a region table, and a patch table;
- comparing a first address associated with first code with records in the trap table and the region table to acquire a comparison result;
- fetching a patch record from the patch table if the comparison result is matched, wherein the patch record indicates a second address;
- fetching second code according to the second address;
- executing the second code;
- branching to third code;
- executing the third code; and
- returning to fourth code following the first code.

18. The program patching method using bus address translation as claimed in claim 17, wherein the trap and patch tables are established in a microprocessor system.

19. The program patching method using bus address translation as claimed in claim 17, wherein the first address is issued by a microprocessor to a first address bus.

20. The program patching method using bus address translation as claimed in claim 17, wherein the second address is issued by a controller to a second address bus.

21. The program patching method using bus address translation as claimed in claim 17, wherein the first code is stored in a ROM.

22. The program patching method using bus address translation as claimed in claim 17, wherein the second code is stored in a RAM.

23. The program patching method using bus address translation as claimed in claim 17, wherein the branching is accomplished by a software interrupt (SWI) and the returning is accomplished by modification of a SWI return address.

24. The program patching method using bus address translation as claimed in claim 17, wherein the third code executes a new function.

25. The program patching method using bus address translation as claimed in claim 17, wherein the second code comprises a header part, a function part, and a tail part, and the header part executes branching, variables pushing, and parameter setting.

26. The program patching method using bus address translation as claimed in claim 25, wherein the header further executes code recovery.

27. The program patching method using bus address translation as claimed in claim 17, further comprising:
- fetching fifth code equal to the first code after executing the third code; and executing the fifth code.

* * * * *